United States Patent [19]

Oosterling et al.

[11] 4,047,369
[45] Sept. 13, 1977

[54] MOWING DEVICE

[75] Inventors: Pieter Adriaan Oosterling; Hendricus Cornelis van Staveren, both of Nieuw-Vennep, Netherlands

[73] Assignee: Multinorm, B.V., Nieuw-Vennep, Netherlands

[21] Appl. No.: 632,017

[22] Filed: Nov. 14, 1975

[30] Foreign Application Priority Data

Dec. 18, 1974 Netherlands .................. 7416533

[51] Int. Cl.² .......................................... A01D 55/18
[52] U.S. Cl. .................................... 56/295; 56/192
[58] Field of Search ............... 56/295, 255, 11.8, 192; 308/190, 191, 193, 194, 195; 74/665 GA, 714, 801, 341–346, 348, 349–372, 377

[56] References Cited

U.S. PATENT DOCUMENTS

| 119,640 | 10/1871 | Polson | 56/295 |
|---|---|---|---|
| 349,105 | 9/1886 | Keller | 56/295 X |
| 507,962 | 10/1893 | Beermaker | 56/255 |
| 1,397,365 | 11/1921 | Cook | 56/295 X |
| 1,536,514 | 5/1925 | Mehls | 56/295 |
| 2,655,813 | 10/1953 | Howell | 308/190 X |
| 2,765,669 | 10/1956 | Tangen | 74/421 R |
| 3,013,372 | 12/1961 | Basham | 56/11.8 |

Primary Examiner—Russell R. Kinsey
Attorney, Agent, or Firm—Snyder, Brown & Ramik

[57] ABSTRACT

A mowing device comprising a housing extending transversely of the direction of movement of said device, a plurality of freely cutting cutting members rotatably journalled on said housing and a driving gear arranged in said housing and formed by a series of gears for driving the cutting members, has the problem that through deformation of the cover of the housing to which the gears are journalled, the relative position of the cutting members and the accurate relative position of the gears may be disturbed.

In order to avoid this problem, the cutting members are rotatably journalled with the aid of lower rolling bearing means with respect to the bottom and with the aid of upper rolling bearing means with respect to the cover of the housing.

10 Claims, 6 Drawing Figures

MOWING DEVICE

The invention relates to a mowing device comprising a housing extending transversely of the direction of movement of said device, a plurality of freely cutting cutting members rotatably journalled in said housing and a driving gear means accomodated in said housing for driving the cutting members and formed by a sequence of gears, each cutting member being rigidly connected with a driving gear of said sequence, whilst the driving gears are coupled with one another by means of coupling gears.

Such a mowing device is known. The cutting members thereof are rotatably journalled with respect to the cover of the housing. A deformation of the cover may, therefore, disturb the relative positions of the cutting members and the accurate relative positions of the gears.

The invention has for its object to provide a firm bearing of the cutting members in fixed positions. The invention provides an improvement of the mowing device of the kind set forth in that the cutting members are rotatably journalled with the aid of lower rolling bearing means with respect to the bottom and with the aid of upper rolling bearing means with respect to the cover of the housing.

The invention will be apparent from the following description of preferred embodiments of the mowing device in accordance with the invention.

Figure 1:
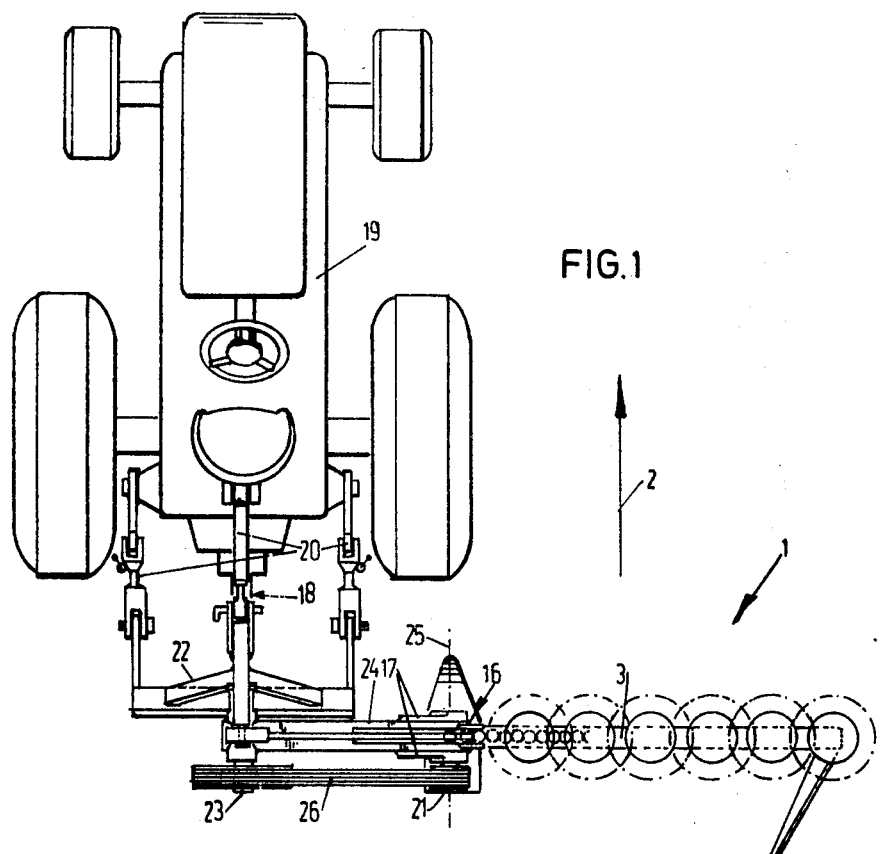
FIG. 1 is a plan view of a tractor with a mowing device in accordance with the invention.
Figure 2:
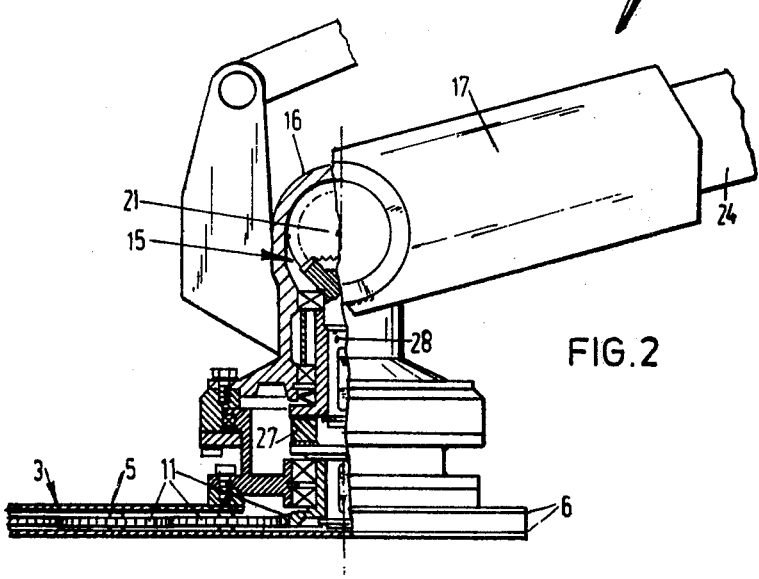
FIG. 2 is a front view, partly broken away, of said mowing device, on an enlarged scale.
Figure 3:
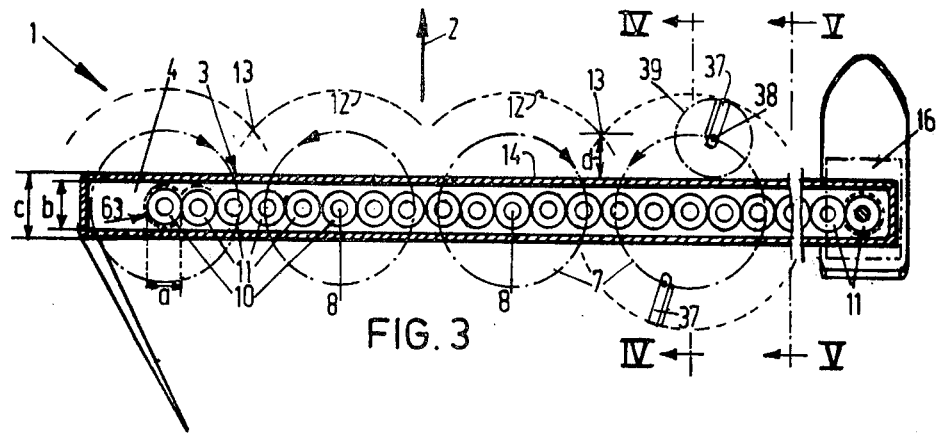
FIG. 3 is a horizontal sectional view of the housing of the driving gear of the mowing device shown in FIG. 1.

Referring to FIG. 1, the mowing device 1 is attached to a frame 22 suspended by the supension rods 20 of a tractor 19, in which frame 22 is journalled a driving shaft 23 driven by the power take-off shaft of the tractor 19 and powered by the universal shaft 18. An auxiliary frame 24 is arranged so as to be pivotable about the horizontal driving shaft 23 with respect to the frame 22. At the other end the auxiliary frame 24 has two ears 17 arranged about a horizontal axis 25 and being coaxial with a housing 16 of a bevel gear system 15. The input shaft 21 of the bevel gear transmission 15 is also coaxial with the axis 25. This shaft 21 is driven through a belt drive 26 by the driving shaft 23.

The mowing device 1 according to the invention comprises a housing 3, extending transversely of its intended direction of movement 2 and having the shape of a flat, elongated beam essentially consisting of a channel shaped bottom 4 and a cover 5 secured thereto by welds 6. On the housing 3 are journalled a plurality of cutting members 7 so as to be rotatable about upright axes 8. The cutting members 7 are arranged near and above the housing 3 and are pairwise rotatable in opposite senses. Each cutting member 7 is rigidly secured by means of bolts 34 to a driving gear 10 of a driving gear means 63 accomodated in the housing 3 and formed by a series of gears, that is to say, said gears 10 and coupling gears 11. The coupling gear 11 nearest the tractor 19 is driven by the bevel gear transmission 15 through an elastic coupling 27 and a shaft 28.

Figure 4:
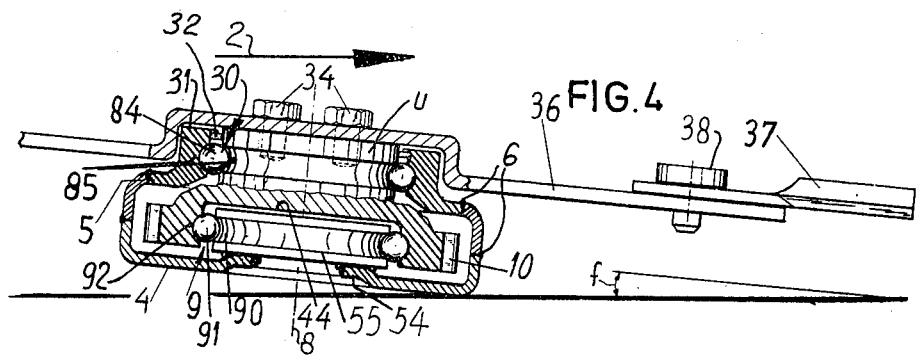
FIG. 4 is a sectional view taken on the line IV—IV in FIG. 3.

Four coupling gears 11 are arranged between every pair of driving gears 10 rotating towards one another. FIG. 4 shows that each cutting member 7 is rotatably journalled with respect to the cover 5, since the upper portion U of the driving gear 10, rigidly secured to the cutting member 7, is journalled in an upright collar 31 of the cover 5 by way of the balls 84 which cooperate with the races 85 formed in the cover 31 and the gear 10 to define a bearing 30 forming the upper rolling bearing means. With respect to the bottom 4 the cutting member 7 is rotatably journalled with the aid of lower rolling bearing means formed by a bearing 9. The races 85 for the balls 84 of the bearing 30 are formed in the collar 31 welded to the cover 5 and in the upper portion U of the gear 10. On the lower side the gear 10 has a recess 44 receiving a disc 55 welded to a depressed portion 54 of the bottom 4 and having a race 90 for balls 91 of the bearing 9. The body of the gear 10 defines the outer race 92 for the balls 91. Owing to the bearing of the cutting members 7 with respect to the cover 5 as well as with respect to the bottom 4 the position of the cutting member 7 is firmly fixed.

Above the bearing 30 there is provided a seal 32.

Each cutting member 7 comprises a disc 36, to which cutters 37 are pivotally fastened. The discs 36 are disposed in coplanar relation so that the cutters 37 move past adjacent discs 36 without touching the same (FIG. 1). The cutters 37 of adjacent cutting members 7 are relatively off-set through an angle of 90° so that they will not come into contact with one another despite the overlap of the cutter paths. Each cutter 37 is freely rotatable about the axis of a pin 38.

Figure 5:
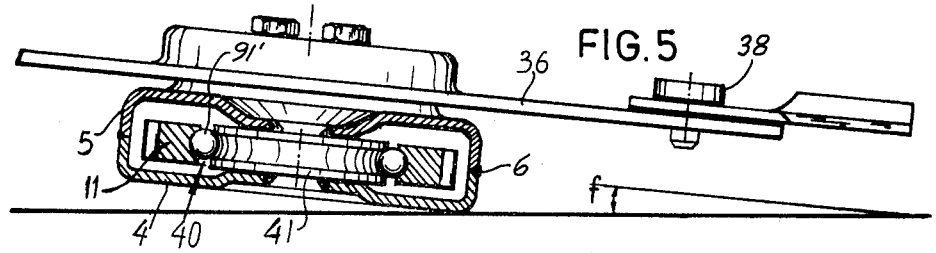
FIG. 5 is a sectional view taken on the line V—V in FIG. 3.

In FIG. 5, the bearing means 40 is formed by an inner race 41 which is positioned between and welded to the cover 5 and bottom 4, the balls 91' and the outer race in the gear 11.

Figure 6:
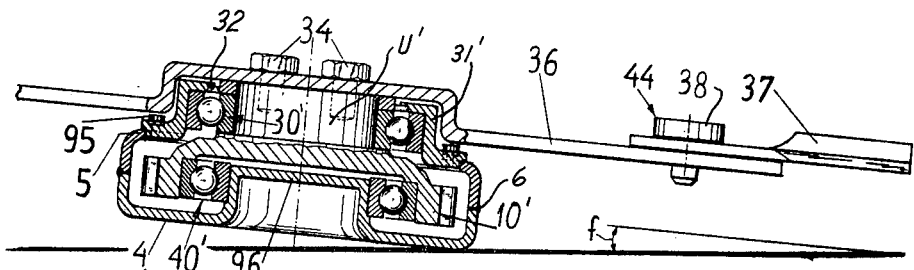
FIG. 6 is a sectional view like FIG. 4 of a further embodiment of the mowing device in accordance with the invention.

FIG. 6 corresponds with FIG. 4 but the collar 31' is secured by bolts 95 to the cover 5, the bearings 30' and 40' are formed by conventional ball bearings and the bearing. The bearing 30' surrounds the upper part U' of the gear 10' 40' is arranged around a bulging part 96 of the bottom 4 and seats within the gear 10'.

The cutting members 7 operate in a freely cutting fashion, that is to say without counter-cutter. The rolling bearing means permit a high speed of rotation so that the freely cutting effect can be obtained by impact.

What we claim is:

1. A rotary mower assembly comprising, in combination:

an elongate housing adapted to extend transverse to the direction of mower movement, said housing including a bottom portion and a cover portion defining an enclosure;

a gear train disposed within said enclosure defined by the housing and including a set of longitudinally spaced cutter driving gears and coupling gears drivingly interconnecting said cutter driving gears;

lower ball bearing means mounted on said bottom portion of the housing for rotatably supporting each cutter driving gear;

upper ball bearing means mounted on said cover portion of the housing for rotatably supporting each cutter driving gear; and a cutter member rigidly secured to each cutter driving gear and lying above said cover portion of the housing.

2. A rotary mower assembly as defined in claim 1 wherein each of said coupling gears is provided with a central opening, and including ball bearing means within each such opening for rotatably journalling the coupling gears within the housing.

3. A rotary mower assembly comprising, in combination:
   an elongate housing adapted to extend transverse to the direction of mower movement, said housing including a bottom portion and a cover portion defining an enclosure;
   a gear train disposed within said enclosure defined by said housing and including a set of cutter driving gears and coupling gears drivingly interconnecting said cutter driving gears, each cutter driving gear including a toothed body portion having an upper portion projecting upwardly from the upper face thereof and having a recess in its lower face, each upper portion projecting through said cover portion of the housing;
   a cutter mounting disc fixed to the upper end of each upper portion in overlying relation to said cover portion of the housing and at least one cutter carried by each mounting disc;
   upper ball bearing means engaging each upper portion below the associated cutter mounting disc for rotatably supporting each such cutter driving gear on said cover portion; and
   lower ball bearing means within the recess of each cutter driving gear for rotatably supporting each such cutter driving gear on said bottom portion of the housing.

4. A rotary mower assembly as defined in claim 3 wherein each coupling gear comprises a toothed body having a central opening, and ball bearing means engaged in each central opening for rotatably supporting each such coupling gear simultaneously on said bottom portion and said cover portion of the housing.

5. A rotary mower assembly as defined in claim 3 wherein each lower ball bearing means comprises an inner race permanently fixed to said bottom portion of the housing and disposed within the recess of the associated cutter driving gear.

6. A rotary mower assembly as defined in claim 5 wherein each lower ball bearing means also includes an outer race formed integrally within the recess of the associated cutter driving gear.

7. A rotary mower assembly as defined in claim 6 wherein each upper ball bearing means includes an inner race formed integrally in the upper portion of the associated cutter driving gear and an outer race integrally formed in said cover portion.

8. A rotary mower assembly as defined in claim 3 wherein each lower ball bearing means comprises a ball bearing seated within the recess of the associated cutter driving gear, said bottom portion of the housing including an integral pedestal portion projecting into the recess and forming a seat for the associated ball bearing.

9. A rotary mower assembly as defined in claim 8 wherein each upper ball and change bearing means comprises a second rolling bearing seated on the upper portion of the associated cutter driving gear, and bearing-retaining cap within which said second ball bearing is seated, each cap being removably attached to said cover portion.

10. A rotary mower assembly as defined in claim 3 wherein each upper ball bearing means includes an inner race formed integrally in the upper portion of the associated cutter driving gear and an outer race integrally formed in said cover portion.

* * * * *